(12) United States Patent
Duan et al.

(10) Patent No.: US 8,902,586 B2
(45) Date of Patent: Dec. 2, 2014

(54) ELECTRONIC DEVICE WITH A VOLUME BUTTON

(71) Applicants: Ju-Ping Duan, Shenzhen (CN); Ming-Fu Luo, Shenzhen (CN)

(72) Inventors: Ju-Ping Duan, Shenzhen (CN); Ming-Fu Luo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 99 days.

(21) Appl. No.: 13/629,990

(22) Filed: Sep. 28, 2012

(65) Prior Publication Data

US 2013/0279128 A1    Oct. 24, 2013

(30) Foreign Application Priority Data

Apr. 20, 2012    (CN) .......................... 2012 1 0117581

(51) Int. Cl.
*H05K 5/00*      (2006.01)
*A47B 81/00*    (2006.01)

(52) U.S. Cl.
USPC ............... 361/679.56; 361/752; 361/679.02; 361/679.01; 312/223.2

(58) Field of Classification Search
CPC ............... G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202; G06F 2200/203; H05K 5/00; H05K 5/0026; H05K 5/0082; H05K 5/0021; H05K 5/0086–5/06; H05K 5/069; H05K 7/005–7/08; H05K 7/20; H05K 7/00; H05K 7/1422; H05K 1/0218–1/0219; H05K 1/00; H05K 3/00; H05K 9/00; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01R 4/00; H01R 9/00; H01R 13/00; H01K 1/00; H01K 3/00; H02B 1/00; H01H 37/00
USPC ................ 361/728, 730, 736, 748, 752, 796, 361/679.01–679.45, 679.55–679.61; 312/223.1, 223.2, 223.6; 345/184, 185
See application file for complete search history.

(56) References Cited

U.S. PATENT DOCUMENTS 6,188,569 B1 *   2/2001   Minemoto et al. ........ 361/679.33
6,639,793 B2 *   10/2003   Lien et al. ................ 361/679.23
7,400,917 B2 *   7/2008   Wood et al. ................ 455/575.8

(Continued)

*Primary Examiner* — Zachary M Pape
*Assistant Examiner* — Razmeen Gafur
(74) *Attorney, Agent, or Firm* — Novak Druce Connolly Bove + Quigg LLP

(57) ABSTRACT

An electronic device includes a housing, a circuit board and a volume button. The housing defining a slot, and includes a fixing block. The fixing block is formed on an inner wall of the housing and positioned adjacent to one end of the slot. A through hole is formed in the fixing block. The circuit board received in the housing includes a volume control module and a mute control module positioned adjacent to the slot. The volume button is movably positioned in the slot and exposed out of the housing. The volume button includes a volume increasing portion and the volume decreasing portion. The volume increasing portion and the volume decreasing portion can be pushed on the volume control module. One end of the volume button passes through the through hole and is capable of triggering the mute control module.

12 Claims, 4 Drawing Sheets

(56) References Cited

U.S. PATENT DOCUMENTS

| | | | |
|---|---|---|---|
| 7,612,997 B1 * | 11/2009 | Diebel et al. | 361/679.56 |
| 7,697,281 B2 * | 4/2010 | Dabov et al. | 361/679.55 |
| 8,280,463 B2 * | 10/2012 | Hori et al. | 455/575.3 |
| 8,289,688 B2 * | 10/2012 | Behar et al. | 361/679.3 |
| 8,451,595 B2 * | 5/2013 | Leung et al. | 361/679.13 |
| 8,457,701 B2 * | 6/2013 | Diebel | 455/575.8 |
| 8,477,492 B2 * | 7/2013 | Rothkopf et al. | 361/679.55 |
| 8,587,939 B2 * | 11/2013 | McClure et al. | 361/679.3 |
| 2010/0061040 A1 * | 3/2010 | Dabov et al. | 361/679.01 |
| 2011/0310580 A1 * | 12/2011 | Leung | 361/807 |

* cited by examiner

ELECTRONIC DEVICE WITH A VOLUME BUTTON

BACKGROUND

1. Technical Field

The present disclosure generally relates to electronic devices, and particularly to an electronic device with a volume button for volume control.

2. Description of Related Art

Electronic devices, such as tablet computers and portable media devices, have volume increase, volume decrease, and mute buttons for controlling volume. Each volume button may be designed smaller for achieving miniaturization of electronic devices. However, it is difficult to assemble the volume buttons in electronic device assembly. In addition, large human fingers render it to be inconvenient for a user to adjust the volume.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
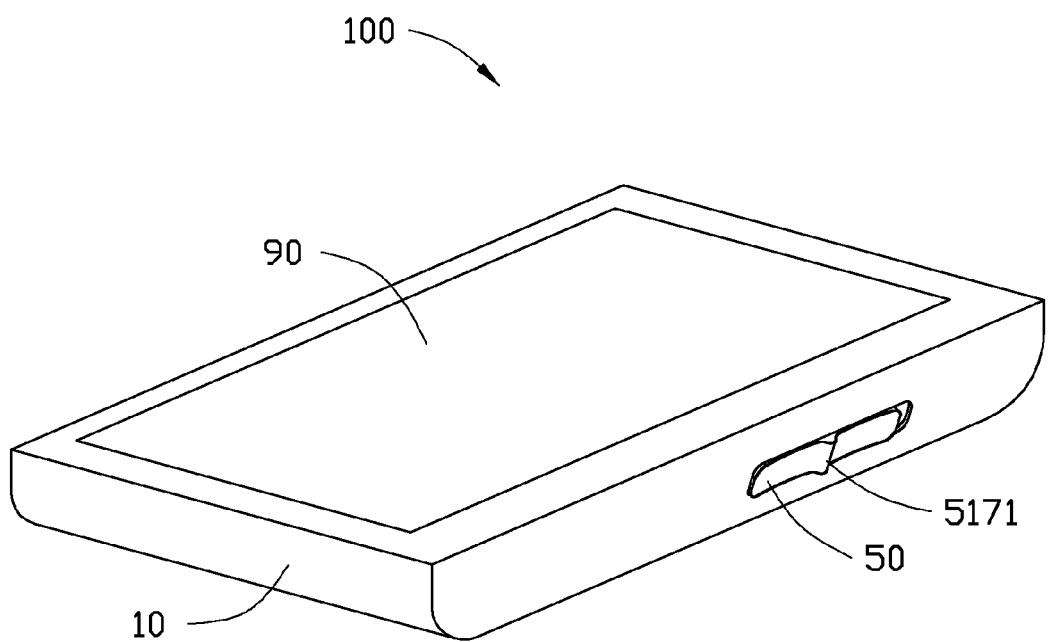
FIG. 1 shows an isometric view of an embodiment of an electronic device having a volume control function.
Figure 2:
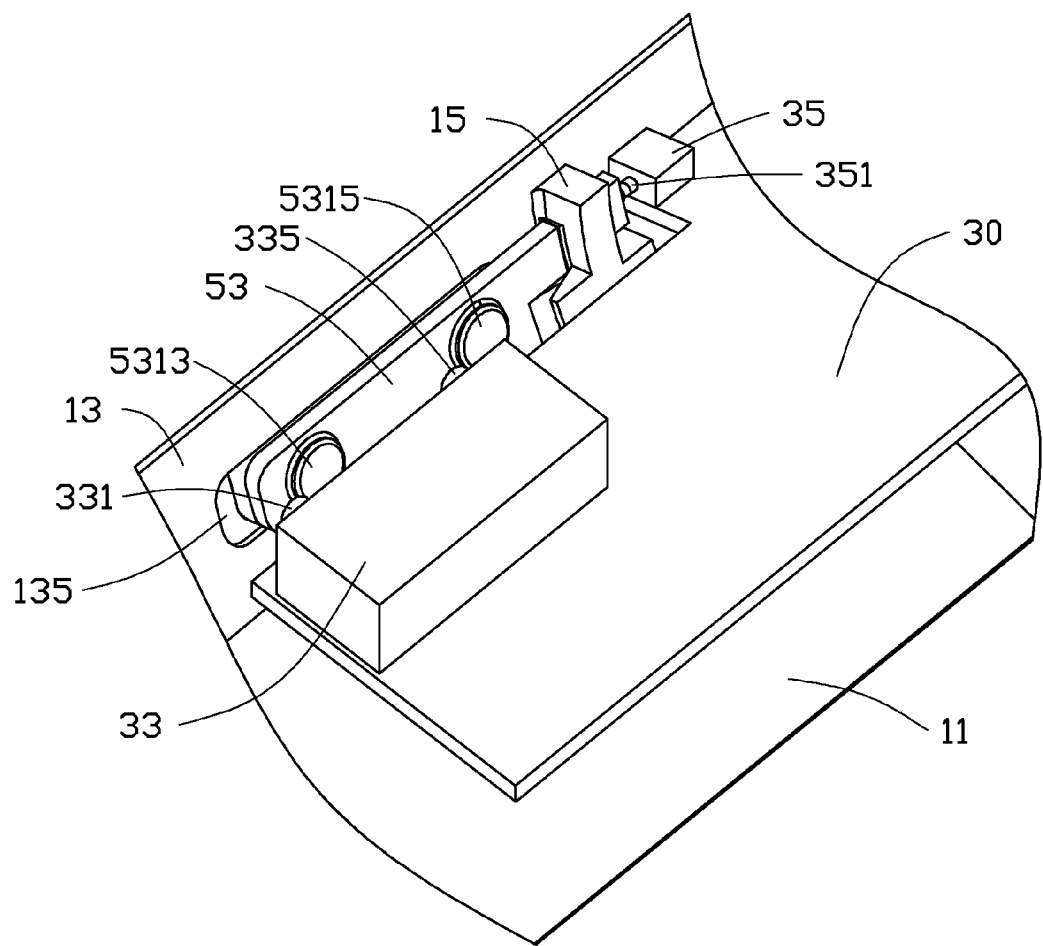
FIG. 2 shows a partial isometric view of an interior area of the electronic device with a volume button for volume control of FIG. 1.

Referring to FIGS. 1 and 2, an embodiment of an electronic device 100 is shown. The electronic device 100 may be a tablet computer, a portable media device, a TV, or other device having a volume control function. In the illustrated embodiment, the electronic device 100 is a tablet computer. The electronic device 100 includes a housing 10, a circuit board 30, a volume button 50 and a display panel 90. The circuit board 30 is received in the housing 10. A volume control module 33 and a mute control module 35 are positioned on the circuit board 30 adjacent to the volume button 50 for responding to pressing operations on the volume button 50 to adjust the volume of the electronic device 100. The display panel 90 is mounted on the housing 10 and electrically connected with the circuit board 30. The electronic device 100 also includes various other functional modules for performing specific functions not described here for simplicity.

Figure 3:
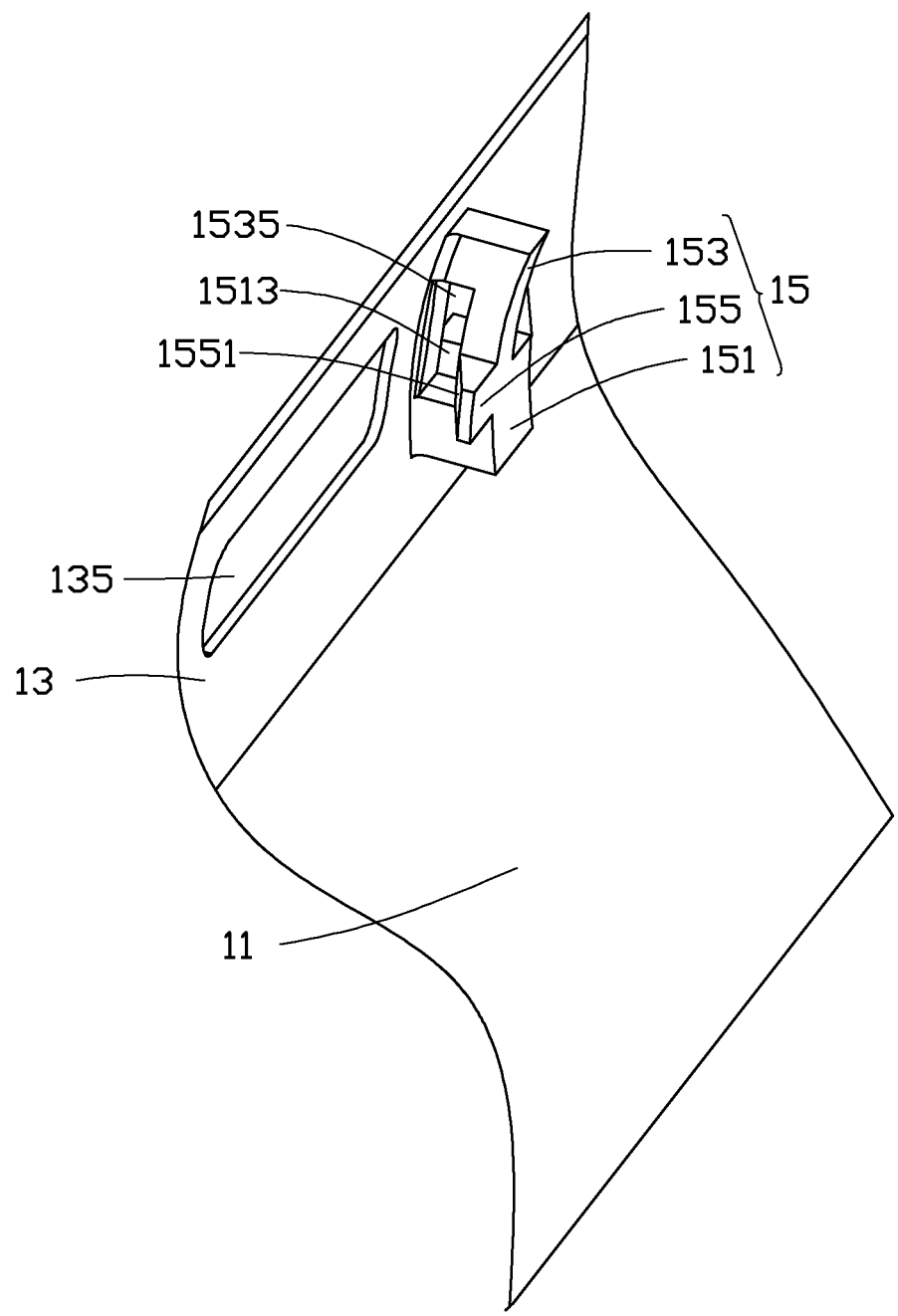
FIG. 3 shows an isometric and enlarged view of part of the housing of the electronic device of FIG. 2.

Also referring to FIG. 3, the housing 10 is a substantially rectangular frame. The housing 10 includes a bottom wall 11, a peripheral wall 13 and a fixing block 15. The peripheral wall 13 extends outward from the edges of the bottom wall 11. A receiving chamber is defined by the bottom wall 11 and the peripheral wall 13 for receiving the functional components. A slot 135 is defined through the peripheral wall 13. The fixing block 15 protrudes from an inner surface of the peripheral wall 13 in the receiving chamber adjacent to the slot 135. The fixing block 15 includes a resisting portion 151, a connecting portion 153 and a pushing portion 155. The resisting portion 151 is positioned on the peripheral wall 13 adjacent to the bottom wall 11. A resisting groove 1513 is formed at one corner of the resisting portion 151 toward the slot 135. The connecting portion 153 protrudes perpendicularly from the peripheral wall 13 away from the bottom wall 11 and connects to the resisting portion 151. A through hole 1535 is defined through the connecting portion 153. The through hole 1535 communicates with the resisting groove 1513. The pushing portion 155 perpendicularly protrudes out from a side surface of a joining portion of the connecting portion 153 and the resisting portion 151, toward the slot 135. The pushing portion 155 is located above the resisting groove 1513 and substantially parallel to the peripheral wall 13. The pushing portion 155 defines a first resisting surface 1551 which faces, and is inclined from, the peripheral wall 13.

The circuit board 30 is received in the receiving chamber. The circuit board 30 is positioned adjacent to the slot 135 and substantially parallel to the bottom wall 11. A volume control module 33 is mounted on the circuit board 30 adjacent to the slot 135.

The volume control module 33 includes a volume increase contact 331 and a volume decrease contact 335 arranged side by side. In the illustrated embodiment, the volume decrease contact 335 is positioned adjacent to the fixing block 15. The mute control module 35 is fixed on the circuit board 30 toward the through hole 1535 of the fixing block 15. The fixing block 15 is positioned between the mute control module 35 and the slot 135. A mute control contact 351 is positioned on an end surface of the mute control module 35 towards the through hole 1535.

Figure 4:
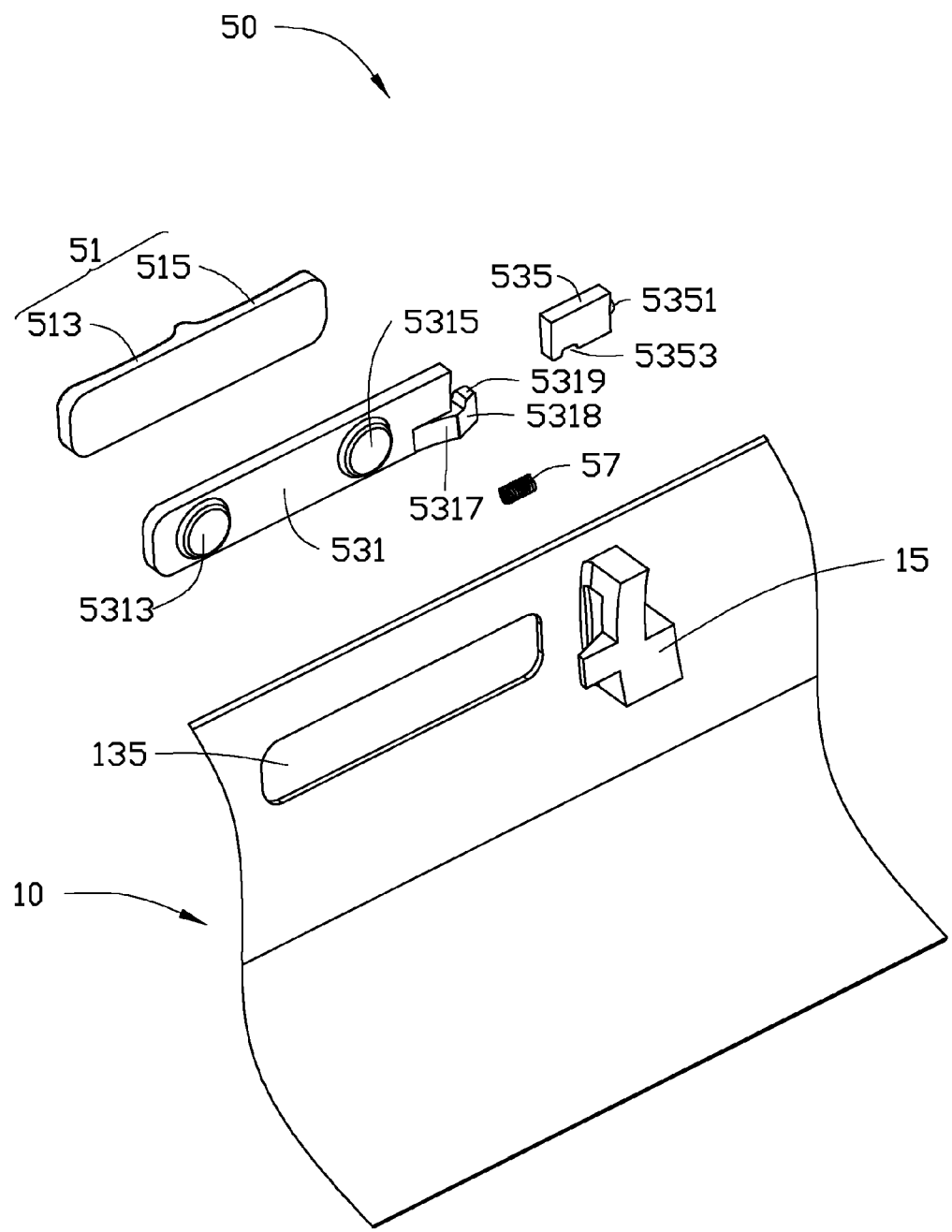
FIG. 4 shows an exploded view of the electronic device of FIG. 2.

Also referring to FIG. 4, the volume button 50 is movably positioned in the slot 135 and the through hole 1535 for adjusting the volume of the electronic device 100. The volume button 50 includes an operation member 51, a volume contact member 53 and an elastic member 57.

The operation member 51 is slidably positioned in the slot 135 and exposed to the outside environment from the housing 10. The operation member 51 is substantially a strip of material. The operation member 51 includes a volume increasing portion 513 and a volume decreasing portion 515 side by side. The volume increasing portion 513 corresponds to the volume increase contact 331, and the volume decreasing portion 515 corresponds to the volume decrease contact 335. In the illustrated embodiment, a length of the operation member 51 is less than that of the slot 135. An anti-slip protrusion 5171 is further formed on a surface of the operation member 51 facing towards the outside of the electronic device 100, for the sake of convenience in the muting operation.

The volume contact member 53 is received in the receiving chamber. The volume contact member 53 is fixedly connected with a rear surface of the operation member 51. The volume contact member 53 is positioned between the operation member 51 and the volume control module 33. A length of the volume contact member 53 is longer than that of the operation member 51. The volume contact member 53 includes a base body 531 and a mute contact block 535. The base body 531 is assembled with the operation member 51. A volume increase trigger 5313 and a volume decrease trigger 5315 protrude from a surface of the base body 531 immediately underneath the operation member 51 and are distanced from each other. The volume increase trigger 5313 corresponds to the volume increasing portion 513 and the volume increase contact 331. The volume decrease trigger 5315 corresponds to the volume decreasing portion 515 and the volume decrease contact 335. The base body 531 further includes a clamping portion 5317 extending from one end of the base body 531 adjacent to the fixing block 15 and the bottom wall 11. A second resisting surface 5318 is formed on the clamping portion 5317 to engage with the first resisting surface 1551. A clamping hook 5319 is formed on a side surface of the clamping portion 5317 away from the bottom wall 11. The mute contact block 535 passes through the through hole 1535 and is clamped by the clamping hook 5319. The mute contact block 535 is positioned between the mute control module 35 and the base body 531. A mute trigger 5351 is positioned on an end surface of the mute contact block 535 toward the mute control module 35 corresponding to the mute control contact 351 for triggering the mute control module 35. An inserting portion 5353 is formed at the mute contact block 535 and clamped with the clamping hook 5319.

The elastic member 57 is received in the resisting groove 1513, and positioned between the clamping portion 5317 and a side wall of the resisting groove 1513. The display panel 90 is positioned parallel to the bottom wall 11 above the circuit board 30 and electrically connected with the circuit board 30.

In assembly, the circuit board 30 is firstly positioned in the housing 10; then the operation member 51 is fixedly connected with the base body 531. The mute contact block 535 engages with the base body 531. After that, the elastic member 57 is inserted into the resisting groove 1513. The operation member 51 is mounted in the slot 135 and is exposed out of the slot 135. The mute contact block 535 passes through the through hole 1535 at the same time. The elastic member 57 is positioned between the clamping portion 5317 and the side wall of the resisting groove 1513. The display panel 90 is finally mounted on the housing 10.

The sound volume of the electronic device 100 is increased when the users press the volume increasing portion 513. The volume increasing portion 513 drives, pushes, or actuates the volume increase trigger 5313 to trigger the volume increase contact 331 of the volume control module 33. When the volume decreasing portion 515 is pressed, the volume decreasing trigger 5315 is pushed or actuated to trigger the volume decrease contact 335 of the volume control module 33 for decreasing the volume of the electronic device 100. If the user wants to mute the electronic device 100, the operation block 51 is pushed along the slot 135 toward the fixing block 15 until the mute trigger 5351 triggers the mute control contact 351. The first resisting surface 1551 engages with the second resisting surface 5318, and the elastic member 57 is compressed between the sidewall of the resisting groove 1513 and the clamping portion 5317. The operation block 51 upon performing the the muting operation, will return to its initial position because of the resiliency of the elastic member 57. The electronic device 100 will stay remain muted until the operation block 51 is again pushed along the slot 135.

The electronic device 100 includes the housing 10, the circuit board 30 received in the housing 10, a volume button 50 movably positioned on the housing 10 and the display panel 90. The structure of the volume button 50 is very simple. The various functions of volume increase, volume decrease and muting are integrated in one volume button 50. The users just need to operate the volume button 50 for adjusting volume for the electronic device 100. Assembly of the electronic device 100 is appropriately facilitated because there is one volume button 50. In addition, the elastic member 57 is received in the resisting groove 1513 for helping the operation block 51 to return to its initial position after volume muting or unmuting. Furthermore, the insertion portion 5353 of the mute contact block 535 is clamped with the clamping hook 5319 of the base body 531 for avoiding an unintentional volume decrease or volume increase during a muting or unmuting operation. The first resisting surface 1551 will engage with the second resisting surface 5318 when the operation block 51 slides along the slot 135 for guiding the operation block 51.

In other embodiments, the elastic member 57 may be omitted; the operation member 51 and the volume contact member 53 may be integrally formed, trigger points or blocks may be positioned on a side surface of the operation member 51 for triggering the volume control module 33, and the mute trigger 5351 can then be positioned on an end surface of the operation member 51 facing toward the mute control module 35.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a housing defining a slot, and comprising a fixing block formed on an inner wall of the housing, the fixing block positioned adjacent to one end of the slot, the fixing block defining a through hole;
   a circuit board received in the housing, and comprising a volume control module and a mute control module positioned adjacent to the slot; and
   a volume button movably positioned in the slot and exposed out of the housing, the volume button comprising a volume increasing portion and a volume decreasing portion, the volume increasing portion and the volume decreasing portion pushing on the volume control module, one end of the volume button passing through the through hole and configured for triggering the mute control module.

2. The electronic device of claim 1, wherein the volume button comprises an operation member and a volume contact member, the operation member is slidably positioned in the slot, the volume contact member is fixedly connected with a rear surface of the operation member in the housing, the volume increasing portion and the volume decreasing portion are positioned on the operation member, the volume contact member passes through the through hole and is configured for triggering the mute control module.

3. The electronic device of claim 2, wherein the volume contact member comprises a base body and a mute contact block, the mute contact block is clamped with the base body, the base body is fixedly connected with a side of the operation member, the mute contact block passes through the through hole, the mute contact block is positioned between the base body and the mute control module.

4. The electronic device of claim 3, wherein the mute contact block comprises a mute trigger positioned on an end surface of the mute contact block toward the mute control module corresponding to the mute control contact that triggers the mute control module.

5. The electronic device of claim 3, wherein the base body comprises a volume increasing trigger and a volume decreasing trigger opposite to the volume increasing trigger, the volume increasing portion corresponds to the volume increase contact, the volume decreasing portion corresponds to the volume decrease contact.

6. The electronic device of claim 5, wherein the base body further comprises a clamping portion protruding from the base body, the mute contact block comprises an insertion portion; the insertion portion is clamped with the clamping portion.

7. The electronic device of claim 5, wherein the volume button further comprises an elastic member, the elastic member is positioned between the clamping portion and the fixing block.

8. The electronic device of claim 7, wherein the fixing block comprises a resisting portion and a connecting portion connecting with the resisting portion, the through hole is defined in the connecting portion, a resisting groove is formed at the resisting portion toward the slot, the resisting groove communicates with the through hole, the elastic member is received in the resisting groove, and positioned between the clamping portion and a sidewall of the resisting groove.

9. The electronic device of claim 8, wherein the fixing block further comprises a pushing portion, the pushing portion is protruding from the connecting portion and the resisting portion toward the slot, a first resisting surface is formed on the pushing portion adjacent to the base body, a second resisting surface is formed on the clamping portion for engaging with the first resisting surface.

10. The electronic device of claim 2, wherein a length of the operation member is less than the length of the slot.

11. The electronic device of claim 2, wherein a length of the volume contact block member is longer than the length of the operation member.

12. The electronic device of claim 2, wherein an anti-slip protrusion is formed on a surface on the operation member exposed out of housing of the volume button.

\* \* \* \* \*